United States Patent
Reid et al.

(10) Patent No.: US 9,922,367 B2
(45) Date of Patent: Mar. 20, 2018

(54) SYSTEM AND METHOD FOR LOCATION RECOGNITION IN INDOOR SPACES

(71) Applicants: Gregorio Reid, Boquete (PA); Ferdinand Packi, Lahr (DE); Viacheslav Filonenko, Dublin (IE)

(72) Inventors: Gregorio Reid, Boquete (PA); Ferdinand Packi, Lahr (DE); Viacheslav Filonenko, Dublin (IE)

( * ) Notice: Subject to any disclaimer, the term of this patent is extended or adjusted under 35 U.S.C. 154(b) by 296 days.

(21) Appl. No.: 14/617,929

(22) Filed: Feb. 9, 2015

(65) Prior Publication Data

US 2015/0228010 A1   Aug. 13, 2015

Related U.S. Application Data

(60) Provisional application No. 61/937,892, filed on Feb. 10, 2014.

(51) Int. Cl.
| | |
|---|---|
| *G06Q 30/06* | (2012.01) |
| *G01S 15/74* | (2006.01) |
| *G01S 5/00* | (2006.01) |
| *G01S 5/18* | (2006.01) |
| *G01S 5/26* | (2006.01) |
| *G01S 5/30* | (2006.01) |

(52) U.S. Cl.
CPC ............ *G06Q 30/0639* (2013.01); *G01S 5/26* (2013.01); *G01S 5/30* (2013.01)

(58) Field of Classification Search
CPC .......... G01S 5/26; G01S 5/30; G06Q 30/0639
See application file for complete search history.

(56) References Cited

U.S. PATENT DOCUMENTS

| | | | |
|---|---|---|---|
| 7,394,346 B2 | 7/2008 | Bodin | |
| 7,929,958 B2 | 4/2011 | Van Erlach | |
| 7,957,725 B2 | 6/2011 | Van Erlach | |
| 8,531,396 B2 | 9/2013 | Underkoffler et al. | |
| 9,157,982 B2* | 10/2015 | Lavery | G01S 1/74 |
| 2005/0043995 A1* | 2/2005 | Nguyen | G06Q 20/202 |
| | | | 705/14.22 |
| 2010/0085838 A1 | 4/2010 | Altman et al. | |
| 2012/0224456 A1* | 9/2012 | Visser | G01S 3/8006 |
| | | | 367/127 |
| 2013/0029682 A1* | 1/2013 | Ganick | G01C 21/206 |
| | | | 455/456.1 |
| 2013/0055354 A1 | 2/2013 | Weinberg et al. | |

(Continued)

OTHER PUBLICATIONS

Florian Faion et al., Intelligent Sensor-Scheduling for Multi-Kinect-Tracking, 2012.

*Primary Examiner* — Daniel Pihulic
(74) *Attorney, Agent, or Firm* — Kevin H. Fortin

(57) ABSTRACT

A system for indoor location identification of electronic devices includes a retail store having a ceiling and a plurality of networked geo-context panels mounted on the ceiling. Each geo-context panel having a network communication device and an ultrasound transmitter capable of broadcasting ultrasonic pulses having a duration of less than 100 ms. At least one portable electronic device in the retail store receives and records the ultrasonic pulses to make a recording. The portable electronic device communicates the recording to at least one of the plurality of geo-context panels to enable the at least one of the geo-context panels to determine a precise location of the electronic device.

19 Claims, 6 Drawing Sheets

(56) References Cited

U.S. PATENT DOCUMENTS

| | | | |
|---|---|---|---|
| 2014/0009378 A1 | 1/2014 | Chew | |
| 2014/0340994 A1* | 11/2014 | Calvarese | G01S 5/18 367/117 |
| 2015/0036462 A1* | 2/2015 | Calvarese | G01S 5/18 367/117 |
| 2015/0127439 A1* | 5/2015 | Campos De Figueiredo Faceira | G06Q 30/0222 705/14.16 |
| 2015/0163764 A1* | 6/2015 | Stern | H04N 7/18 348/143 |
| 2015/0212190 A1* | 7/2015 | Calvarese | G01S 3/80 367/127 |
| 2015/0228010 A1* | 8/2015 | Reid | G01S 5/26 705/26.9 |
| 2015/0234033 A1* | 8/2015 | Jamieson | G01S 5/04 455/456.1 |

\* cited by examiner

SYSTEM AND METHOD FOR LOCATION RECOGNITION IN INDOOR SPACES

PRIORITY CLAIM

This patent application claims the benefit of U.S. Provisional Patent Application No. 61/937,892, filed 10 Feb. 2014.

FIELD OF THE INVENTION

The present invention pertains to using context recognition to enable to improve in-store shopping. In particular, the present invention relates to systems and methods that enable location recognition within a store.

BACKGROUND OF THE INVENTION

Retail stores include grocery stores, shopping malls, electronic stores, and various other brick-and-mortar locations that vend goods to customers who are physically present in the retail store. The term retail store(s) is intended to be broadly construed to include any vendor location whether indoors or outdoors, and to also include sales transactions of any type between the retailer and a human customer.

Many stores track the movement of customers within the stores in order to use tracking data to optimize product presentation and ease customer experience. Typically movements are tracked by optical recognition of customers, and their movements in the stores.

Many stores realize that the brick-and-mortar location sometimes serves as a showroom for the customer who later purchases products from a discount online venue. Such shopping patterns have seriously eroded market share and profitability for many brick-and-mortar retailers.

With the advent of handheld smart phones and other devices such as notepad computers, and context recognition eye-glass technology, there is further opportunity for shoppers within a retail store to order goods online in real time. This means that shoppers can order the showcased goods online from a discount on-line retailer, even while they stand in the location of a brick-and-mortar retailer.

U.S. Patent Publication No. US2010/0085838 A1 to Altman et al. discloses a system for small space positioning. The system includes a moveable transmitter and a receiving unit. The transmitter transmits a modulated continuous wave. The modulated continuous wave includes a carrier signal and a base-band signal. The receiving unit receives signals transmitted by the transmitting device and determines a position of the transmitting device within the approximate range based on analysis of both the carrier signal and the base-band signal received from the transmitting device.

The present invention seeks a technological solution to improve shopper experience in a retail store.

SUMMARY OF THE INVENTION

Accurate context recognition capability within a retail store enables customers to access information about products that they can see. Accurate context recognition capability also enables a brick-and-mortar retailer to offer discounts, coupons and alternatives directly to the customer through the customers' mobile electronic device. Importantly, this can be done while the customer is viewing the product. Preferably, context recognition yields accuracy of less than ten centimeters, and optimally less than one centimeter.

Combining data from a context recognition system with centimeter (cm), or sub-centimeter accuracy, and a known retail product layout including plan-o-gram data enables mapping and localization of even the smallest products, such as pharmaceuticals, cosmetics, beverages and electronics with a shopper's mobile electronic device. Context recognition with centimeter, or sub-centimeter, accuracy is the foundation on which product specific content can be automatically sent to a shopper's mobile electronic device based on the proximity of the shopper's mobile electronic device to the product.

With the customer context recognized, it is possible to push text messages, or other electronic messages to the customer's smart-phone or other mobile electronic device. These messages can provide coupons, discount offers based on volume, delivery options for products sold by the retailer that are not in inventory, alternative product choices, and delivery options for products not normally sold by the retailer but in inventory of a third party retailer or a third party wholesaler.

Product orders placed through the customer's mobile electronic device can be electronically invoiced and paid for at a point of sale check out system operated by the retailer. Accordingly, the point of sale check out enables funds to be paid directly by the customer to the retailer for goods and services purchased both in-store and ordered online. The retailer can thus sell both inventoried and non-inventoried goods. The retailer can make both direct sales and commissioned sales of the goods of third party retailers and wholesalers.

The processing of payments by the brick-and-mortar retailer with the retailer's point of sales system enables the retailer to contract with various online retailers to receive a margin or commission for all goods purchased by customers within the brick-and-mortar retailer store location.

To adequately serve the customer and make the system useful for a retailer, the context recognition function needs to be optimized. Optimization of the context recognition function can be achieved in a number of ways. The present invention enables customers to obtain the best prices from a brick-and-mortar retailer in real-time when the customer decides to make a purchase.

The present invention uses a combination of coarse localization and fine localization to determine within centimeter accuracy the position of a shoppers portable electronic device. Coarse localization yields a sub-meter accuracy and can be performed in a number of conventional ways. For example, a magnetic field viewer can determine the location of various electronic devices in a store and this yields a coarse localization methodology. When interference is eliminated (from known electrical devices and materials that interfere with magnetic fields) then the coarse location of the customer mobile electronic device can be generally determined. Further, real time video of the store can also yield a coarse location of a shopper and its portable electronic device.

These and other coarse localization methods and can be integrated into the present invention to enable the fine localization to be more readily achieved, to minimize the threshold number of geo-context panels required for achieving fine localization, or enabling increased spacing between the geo-context panels, and reducing the number of ultrasonic frequencies required to enable accurate trilateration or other location method.

The present invention relies on an array of geo-context panels mounted within a structure such as a store. The geo-context panels emit ultrasonic frequency signals to enable fine localization (location detection) of a customer's portable electronic device within the store.

The fine localization begins with the geo-context panel broadcasting Wi-Fi alert to establish communication with the portable electronic device. The portable electronic device responds to the Wi-Fi alert by recording a segment of ambient sound. Simultaneously the geo-context panel array broadcasts a variety of ultrasound frequencies from a variety of fixed locations.

These ultrasound frequencies are within a range detectable by a microphone on the portable electronic device. The ultrasound frequencies are broadcast simultaneously and very short pulses. A period of silence follows these pulses. These pulses are too short in duration to be perceived by most humans. Dogs might hear the ultrasound as a click.

In one embodiment, the pulses are from 1 to 10 ms in duration, followed by 90 to 99 ms period of silence.

The pulses are recorded by the portable electronic device, and the recording is communicated to at least one of the geo-context panels. The geo-context panels have sufficient processing capability to utilize these recordings to determine within 3 cm accuracy the location of the portable electronic device. The context panels are networked to enable load-balancing and sharing of processing demands.

Currently most portable electronic devices have a microphone with a sampling rate of 48 kHz. This limits the sampling rate of the various ultrasonic frequencies broadcast by the geo-context panels to less than 24 kHz. New portable electronic devices have microphones with a sampling rate of 96 kHz, which expands the ability of the present invention to broadcast various ultrasonic frequencies having a sampling rate of 48 kHz.

The greater the sampling rate the greater the location accuracy of the present invention. However the present invention needs to operate within the context of available hardware, so the various examples provided in this patent application are based on portable electronic devices having microphones with an acoustic sampling rate of 48 kHz.

The present invention includes a system for indoor location identification in a retail store having a ceiling. A plurality of networked geo-context panels mount on the ceiling. Each geo-context panel having a network communication device and an ultrasound transmitter capable of broadcasting ultrasonic pulses. The pulses have a duration of less than 100 ms so that they are virtually undetectable by humans.

Customers carry portable electronic devices in the retail store. Such devices are equipped with software or hardware for receiving and recording the ultrasonic pulses and making a recording, and for communicating the recording to at least one of the geo-context panels. This enables the geo-context panels to determine a precise location of the electronic device.

In one embodiment of the invention the system uses coarse and fine location identification. Video, magnetic field mapping, and RFID systems are proposes as a means for coarse localization. Such devices are in communication with at least one of the geo context panels to determine a general location of the portable electronic device. The geo-context panels utilize the general location to enable rapid determination of the precise location.

The geo-context panels are arranged in a grid of constellations. Some of the geo-context panels form a constellation, and each of the geo-context panels in the constellation transmit ultrasonic pulses of a different frequency simultaneously. In a constellation of seven geo-context panels, a unique frequency pulse is generated by each of the seven geo-context panels. This enables achieving a high precision in the location of the portable electronic device.

The ultrasonic pulses have a duration of less than 100 ms, in a preferred embodiment the pulses last less than 20 ms. In another embodiment, the pulses have a duration of less than 5 ms so that they are not perceived by humans and so that they do not irritate dogs.

The portable electronic device includes a network communication device (i.e. WiFi hardware) that communicates the recording to at least one of said geo-context panels via a WiFi network. The recording includes at least some of the ultrasonic pulses, which can enable identification of the location of the portable electronic device.

The recording is communicated automatically and rapidly. Preferably, the recording is communicated instantly, or within 100 ms from the time the recording is made. A typical smart phone can be programmed to do this.

The system enables geo-context panels to communicate product information to the portable electronic device via the WiFi network. The product information can include nutrition details in the case of food products, product specifications, discount coupons, volume discount offers, or any relevant product information. The product information typically pertains to products of interest.

Products of interest are products proximal to the portable electronic device in one embodiment of the invention. In another embodiment of the invention products of interest include non-inventoried products that are similar in some manner to the products in proximity to the mobile electronic device.

The geo-context panels use trilateration to determine the location of the portable electronic device. Multilateration and triangulation techniques are also possible.

The system of the present invention is capable of location accuracy of within a three centimeters, which enables precise identification of products of interest. Thus, identification of a product of interest can be within a predetermined distance from the electronic device, such as 3 cm. A customer need only place its portable electronic device near a product to obtain product information or coupons. In another embodiment, the customer need only carry the portable electronic device and product information is delivered via the network when the customer stops long enough to look at a product.

DETAILED DESCRIPTION

Figure 1:
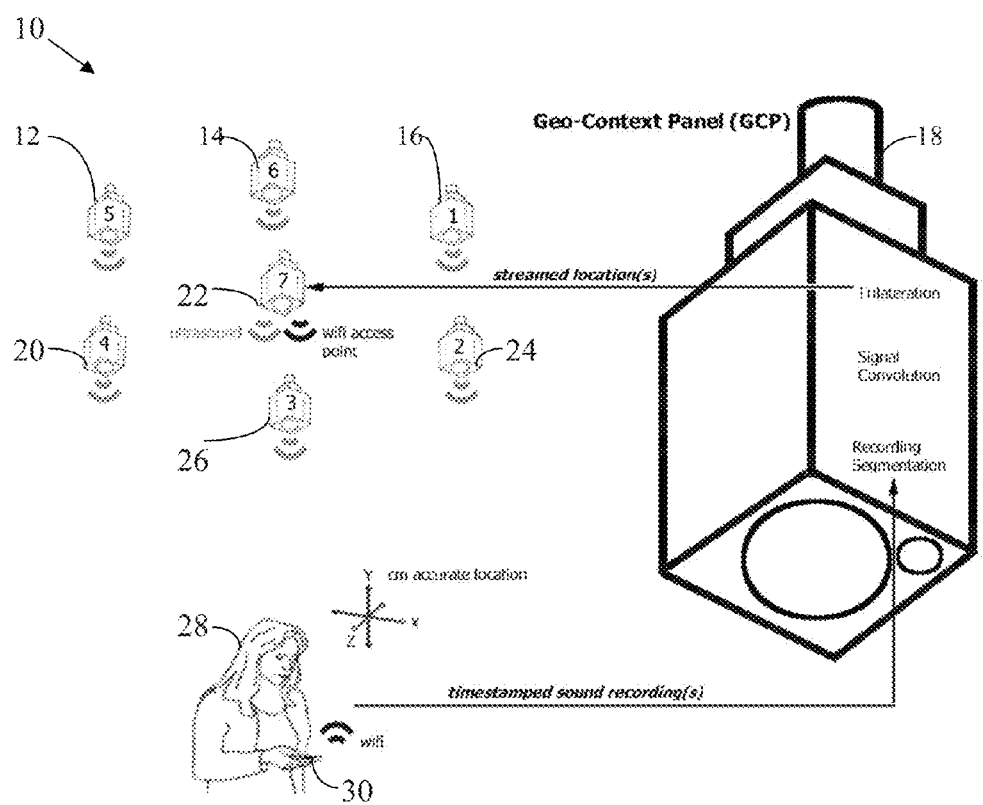
FIG. 1 is a system in accordance with the present invention.

FIG. 1 shows a system 10, in accordance with the present invention. The system 10 includes a set of geo-context panels 12-26. The geo-context panel 18 is enlarged. The geo-context panels 12 through 26 are mounted on a ceiling for example in the retail store. It can be appreciated that although ceiling mounted geo-context panels are preferred in accordance with the present invention that geo-context panels can be mounted or hung from other devices that position the geo-context panel optimally for detecting movement of people within a store.

Each geo-context panel 12 through 26 is capable of trilateration, signal convolution and recording segmentation.

Customer 28 is shown holding a portable electronic device 30. It can be appreciated that customer 28 can be any human in a store, and the portable electronic device 30 may include any portable electronic device capable of communications. Examples of portable electronic devices 30 include smart phones, tablet computers, and wearable devices.

The device 30 is programmed with software to communicate with the geo-context panels communicates in response to a Wi-Fi alert broadcasted by at least one geo-context panel, or other suitable device networked with the geo-context panels. The device samples noise and broadcasts the sample back to the geo-context panels in response to the Wi-Fi alert. A number of the geo-context panels 12-26, or a device networked therewith, then determines the position of the device 30 to sub 3 cm accuracy.

Figure 2:
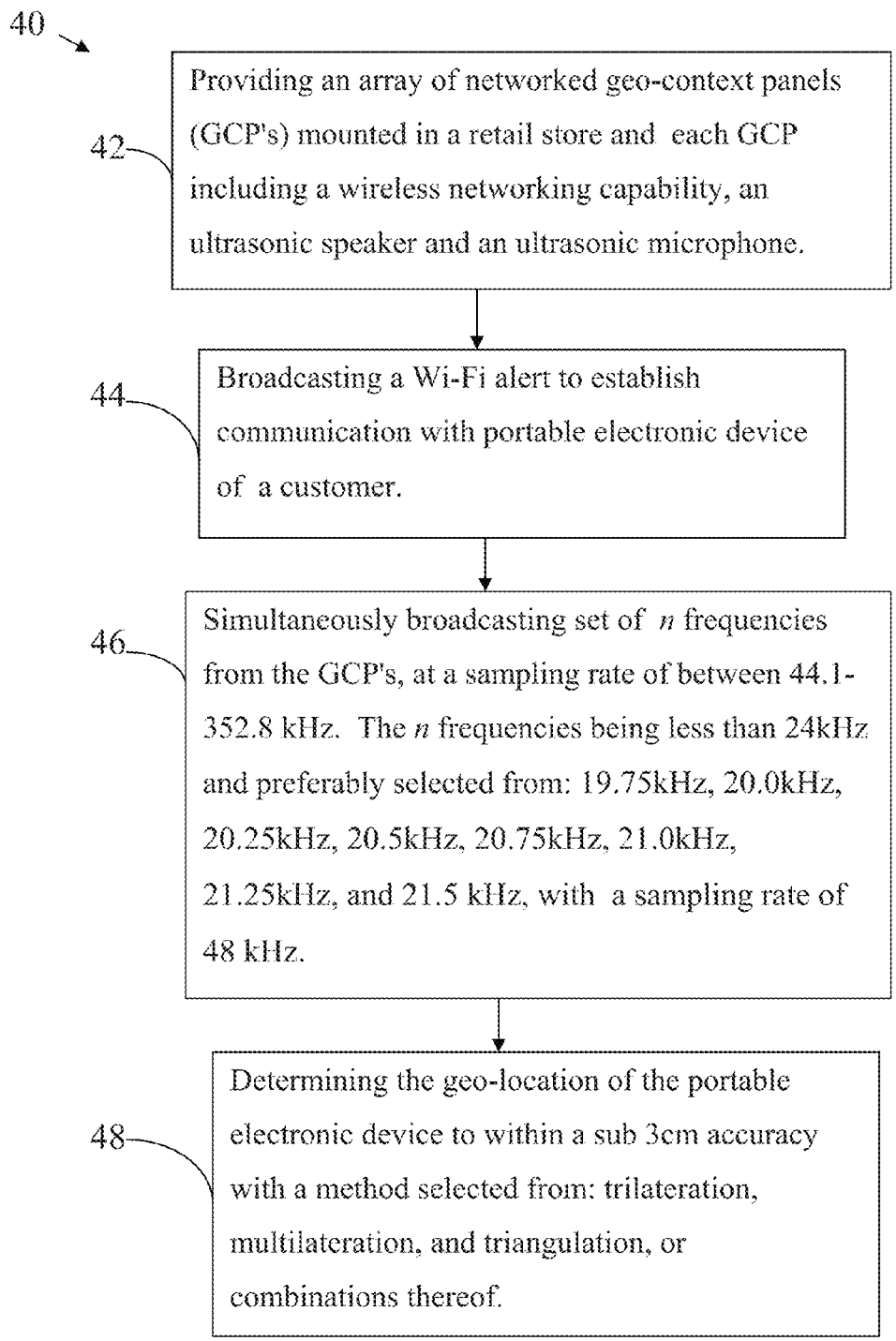
FIG. 2 is a flow chart of a method in accordance with the present invention.

FIG. 2 is a method of determining the geo-location of the portable electronic device 30 in a structure such as a store. The method is generally designated with the reference numeral 40. The method 40 includes the step 42 of providing an array of networked geo-context panels (GCP's) mounted in a retail store. Each geo-context panel includes wireless networking capability. Each geo-context panel further includes an ultrasonic speaker and ultrasonic microphone for communicating ultrasonic signals.

In one embodiment each geo-context panel is capable of communicating up to nine ultrasonic frequency signals.

In another embodiment, seven geo-context panels are arranged in a single constellation of seven geo-context panels. In this embodiment, each of the seven geo-context panels communicates a different ultrasonic frequency signal. In this way the constellation of geo-context panels is capable of communicating numerous frequencies of ultrasonic signals at the same time. The constellations can be grouped in a grid, and the grid expanded to cover any appropriate area of the store or other structure.

The method 40 also includes the step 44 of broadcasting a Wi-Fi alert to establish communication with the portable electronic device of the customer. In response to the Wi-Fi alert the portable electronic device samples and records ambient noise. The recording, or representation thereof, is then communicated back to the geo-context panels, or other device networked with the geo-context panels. This enables the system to automatically filter noise. The Wi-Fi alert can utilize any standard networking protocol such as the 802.11x protocol.

The step 46 simultaneously broadcasts a set of n frequencies from the geo-context panels. These frequencies are broadcast at a sampling rate of 44.1 to 352.8 kHz. The n frequencies are all less than 24 kHz and preferably selected from: 19.75 kHz, 20.0 kHz, 20.25 kHz, 20.5 kHz, 20.75 kHz, 21.0 kHz, 21.25 kHz, and 21.5 kHz, with a sampling rate of 48 kHz.

The step 48 determines the geolocation of the portable electronic device to within a sub 3 cm accuracy. The step of determining is accomplished with the method selected from trilateration, multilateration, and triangulation, or combinations thereof.

Figure 3:
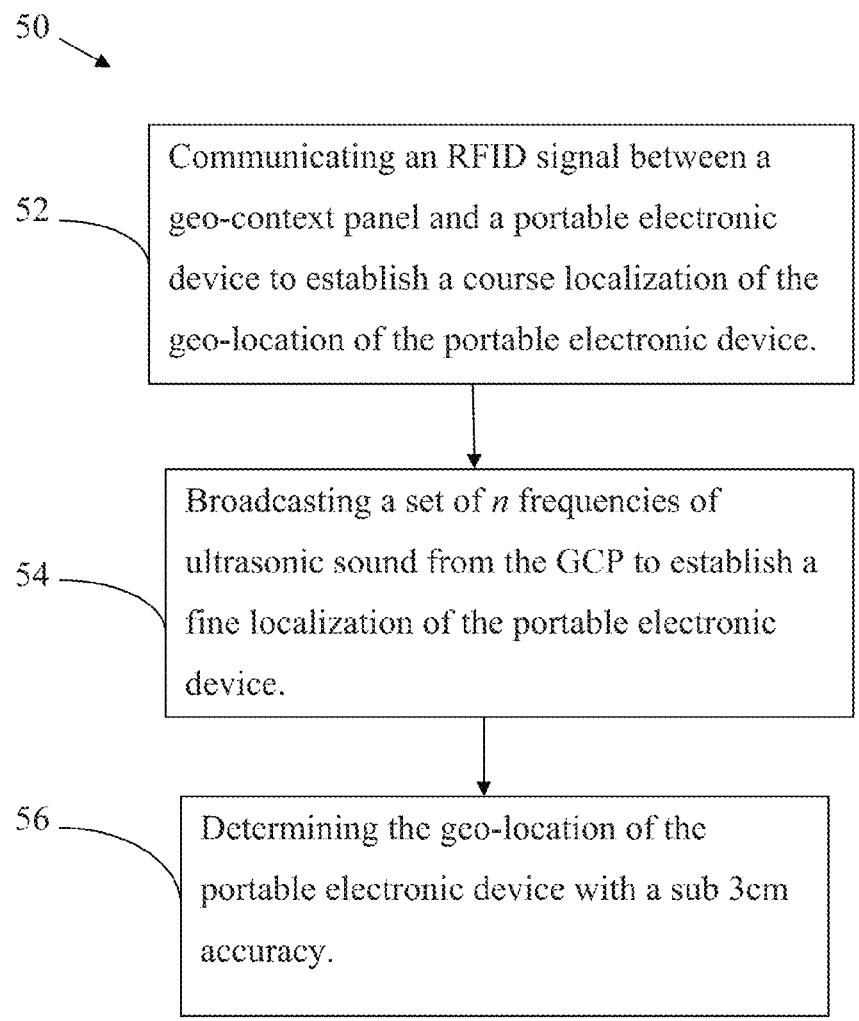
FIG. 3 is a flow chart of a variation of the method of FIG. 2.

FIG. 3 shows a variation of the method of FIG. 2. The method of FIG. 3 is generally designated with the reference numeral 50. The method 50 includes the step 52 of communicating a RFID signal between a geo-context panel and the portable electronic device to establish a course localization of the geolocation of the portable electronic device.

Step 54 broadcasts a set of and frequencies of ultrasonic sound from the GCP to establish a fine localization of the portable electronic device. Step 56 determines the geolocation of the portable electronic device with a sub 3 cm accuracy.

Figure 5:
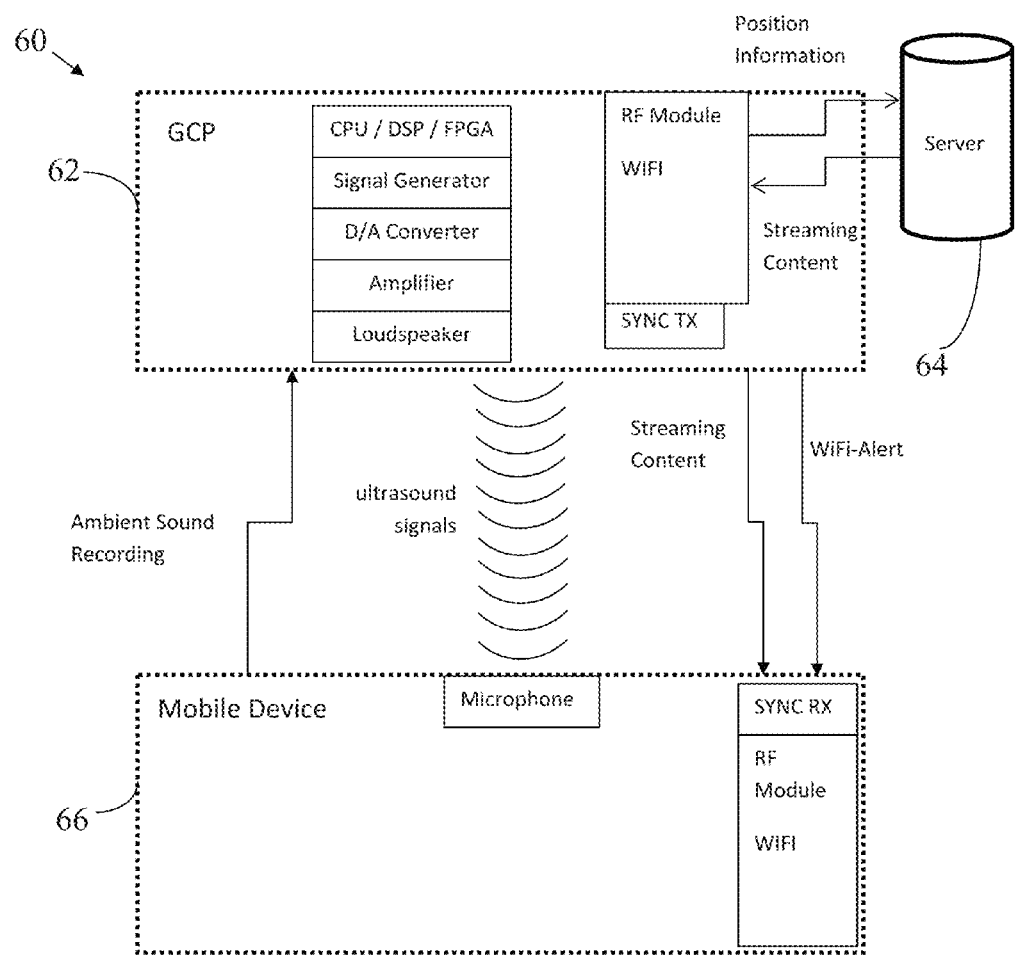
FIG. 5 is a system diagram in accordance with the present invention.

FIG. 5 shows a system in accordance with the present invention, generally designated but the reference numeral 60. The system 60 includes a geo-context panel (GCP) 62. In accordance with the present invention numerous geo-context panels 62 are mounted in a structure such as a store. The system 60 also includes a server 64 and a mobile electronic device 66.

The server 64 is a general-purpose computer and operative to communicate via a network with the geo-context panel 62. It can be appreciated that any number of geo-context panel 62 can communicate with the server 64. Server 64 can be co-located in the same building with the geo-context panels 62, or located remotely.

Although the server 64 is included with the system 60, it can be appreciated that the geo-context panels can be adapted with the appropriate computing capacity and distributed computing capability so that the server 64 may not be required for proper functioning of the system 60.

The geo-context panel 62 is equipped with a central processing unit (CPU), a digital signal processor (DSP), and an FPGA. The geo-context panel 62 also includes a signal generator, a digital to analog converter, an amplifier, and loudspeakers. The geo-context panel 62 includes communication capability including a radio frequency (RF) module and a Wi-Fi module capable of wireless networking.

The geo-context panel 62 communicates position information relating to the mobile device 66 to the server 64. Server 64 processes this position information along with store planogram information to determine products of interest to the customer. Products of interest are products positioned near to or adjacent the mobile device 66.

In one embodiment of the invention the server 66 accesses product information relating to the products of interest. The product information can be communicated to the server via a network from a database including detailed product information, coupons, promotions, and other information.

The server 64 compiles content that would interest the customer whose mobile device is in proximity to products of interest. This content is streamed to the geo-context panel and then communicated to the mobile device 64. In this way product information, coupons, promotions and other information can be communicated in real time to the customer based on their proximity to products of interest.

The geo-context panel 62 communicates via ultrasound signals to the mobile device 66. Preferably the ultrasonic signals are a pulse having a duration of less than 10 ms duration, and more preferably a duration of 5 ms. Each pulse is spaced by a pause of 90-99 ms.

The mobile device 66 records ambient sound including the ultrasonic signals. The recording has a duration of less than 100 ms, and preferably between 5-80 ms, and more preferably 10-25 ms. The recording is immediately communicated back to the nearest geo-context panel 62 to enable the geo-context panel 62 to determine the exact location of the mobile device 66.

Additionally, prior to communicating the ultrasonic signals, the geo-context panel 66 communicates a Wi-Fi alert, which triggers the mobile device 66 to record the ambient sounds including the ultrasonic signals.

Recording and communicating the recorded ambient sounds by the portable electronic device enables the geo-context panel 62 to accurately determine the location of the mobile device 66.

The geo-context panel 62 also streams product information content to the mobile device 66. This product information, and one embodiment, is the same product information at the geo-context panel 62 received from the server 64.

The product information is tailored for viewing by the customer with the mobile device 66. This eases the customer shopping experience by enabling the customer to view products and services that are not in inventory in the store, but can be ordered online from any of a variety of vendors. In the case where the vendor is a third-party store may automatically collect commission based on the sale. Further the store may collect payment for the products purchased by the customer through its own point of sale terminal. This provides a distinct advantage to the store by increasing its revenues and profits based on sales of goods that it does not even keep in inventory.

The system 60 may simultaneously access numerous mobile electronic devices 66 communicating custom product information and transacting business with these numerous mobile electronic devices simultaneously.

In one embodiment, the mobile devices equipped with its own point-of-sale payment system and purchases made through the mobile device are independent of the point-of-sale system of the store. In this case, the store can receive commissions from sales originating the physical location of the store.

Micro-Ultrasound Macro-RF (MUMR) Positioning

The set of geo-context panels (GCP) 12-26 are each equipped in operative communication with an ultrasound speaker, microphone, Wi-Fi (or other wireless networking), Ethernet, multi-core CPUs, memory and solid state storage, and optionally lighting, camera and other peripherals. The microphone can detect ultrasonic sound within the range broadcast by the GCP's.

The GCPs 12-26 are arranged in a grid pattern to enable maximum positioning accuracy, for a given grid geometry. The grid is scalable to any size, though the number of discrete ultrasound signals used by the GCP's is limited. The covered area is divided into repeating sub patterns. Within every sub pattern (cell) the relative position of a mobile electronic device is calculated with respect to the cell's origin, by calculating distances to several GCP's positions using multilateration over ultrasound time difference of arrival (TDOA) or time of flight (TOF).

Multilateration is a navigation technique based on the measurement of the difference in distance to two stations at known locations that broadcast signals at known times. Unlike measurements of absolute distance or angle, measuring the difference in distance between two stations results in an infinite number of locations that satisfy the measurement. When these possible locations are plotted, they form a hyperbolic curve. To locate the exact location along that curve, multilateration relies on multiple measurements including a second measurement taken to a different pair of stations will produce a second curve, which intersects with the first. When the two curves are compared, a small number of possible locations are revealed, producing a "fix". In the three-dimensional case this can be expressed as an intersection of hyperboloids, where the position fix can be estimated by solving a high dimensional, nonlinear system of equations.

It can be appreciated that trilateration and triangulation techniques can also be used in accordance with the present invention. Trilateration uses distances or absolute measurements of time-of-flight from three or more sites, or with triangulation, which uses the measurement of absolute angles.

In one embodiment of the invention the geo-context panels 12-26 employ a method of geolocation of a customer 28 is determined by a technique selected from multilateration, trilateration and triangulation, or combinations thereof.

To overcome the ambiguity among repeating cells the mobile electronic device is mapped to a certain cell using radio frequency identification (RFID) techniques. Knowing the actual cell (coarse localization), and the precise position within the cell (fine localization) yields the absolute position of the mobile electronic device. The ultrasound signals emitted by the geo-context panels are preferably highly auto-correlated while showing little cross correlation with the other signals in the set. Also, they are designed to minimize interference from ambient noise. On the receiving side, preferably the auto correlation peaks coincide to within a few microseconds. More preferably the peaks exactly coincide.

The geo-context panels 12-26 maintain constant communication with mobile electronic devices within the indoor space. All geo-context panels 12-26 run a Real Time OS (RTOS) and are synchronized to within 28 microseconds, or less, to minimize localization error and to optimize system accuracy. Each geo-context panel broadcasts 1 of n ultrasound frequencies on the same schedule. Where n is typically at least between 7 and 9, but can be greater than 9. The use of between 7 and 9 frequency channels enables the system of the present invention to cover any sized room, including sports stadiums, large manufacturing facilities, and superstore retail spaces.

The bandwidth of each signal is preferably 500 to 1000 Hz. The source signals are generated and chosen to have a narrow auto correlation peak, while minimizing to an insignificant level, the amount of cross correlation between the signals.

One embodiment of the invention has signal center frequencies of: 19.75 kHz, 20.0 kHz, 20.25 kHz, 20.5 kHz, 20.75 kHz, 21.0 kHz, 21.25 kHz, 21.5 kHz at a 44.1 kHz sampling rate. Typical signal spacing is 250-1000 Hz. In one embodiment of the invention, a $9^{th}$ signal can be added at center frequency of 21.75 kHz.

A 48 kHz sampling rate allows for a proportional increase in the number of available signals up to the 24 kHz Nyquist border. Most portable electronic devices are equipped to enable a 48 kHz sampling rate. Newer models are equipped to enable a 96 kHz sampling rate.

In dry air, at 20 degrees C., the optimal spatial resolution shown in Table 1 below:

TABLE 1

| SAMPLING RATE | OPTIMAL SPATIAL RESOLUTION |
|---|---|
| 44100 Hz | 0.78 cm |
| 48000 Hz | 0.72 cm |
| 96000 Hz | 0.36 cm |
| 192000 Hz | 0.18 cm |
| 352800 Hz | 0.098 cm |

In one embodiment of the invention a 96 kHz sampling rate is used in order to yield a sub 2 cm accuracy for localization, and preferably an accuracy nearing 0.36 cm, per Table 1 above.

In another embodiment, a 352.8 kHz sampling rate is used to yield an accuracy in distance measurements of 1 cm or less. Accordingly, the location of a handheld electronic device can be identified with sub 1 cm accuracy with the system of the present invention.

Each ultrasound broadcast is immediately preceded by a Wi-Fi alert. An application running on the mobile electronic device listens for the Wi-Fi alert, and uses that as a baseline for the sound departure time. This baseline is adjusted by a time offset to estimate the actual time the sound departs from the speaker. The RTOS, and real-time drivers associated with it, allow for a very high degree of determinism (predictability), such that the time displacement between when the Wi-Fi alert is sent, and the succeeding ultrasound signal is sent is stable, with near zero variability.

An application running on the mobile electronic device 30, upon receiving the Wi-Fi alert, immediately records ambient noise for a predetermined duration, on the order of milliseconds, as specified in the Wi-Fi alert datagram, and immediately transmits this recording back to any GCP.

The GCP segments the recording into processable, uniform chunks and performs floating point conversion. A cross correlation is performed on the chunks to detect a minimum of three source signals required for trilateration. The signals are designed to be inaudible with signature peaks.

A minimum of three distances, from the known positions of the GCPs, to the mobile electronic device are computed based on a time of arrival (TOA) approach. These distances are then trilaterated with respect to the retailer's planogram coordinate system to arrive at the mobile electronic devices x,y,z position. An alternative to the TOA approach is to use a time difference of arrival (TDOA) approach, but this requires utilization of one frequency as a clock, so while the TDOA approach is possible, the TOA approach is preferred.

Cross Correlation

The GCPs are static and mounted at known positions. These GCP's emit positioning signals periodically. These signals can be generated, e.g., by a spectrum-spreading method.

The common channel is divided among the different GCP's by means of Frequency Division Multiplex (FDM). The signal duration and frequency range is chosen to yield a sufficient number of distinguishable signals. The signals are limited to a certain bandwidth by use of a high-order FIR-filter to ensure the property of inaudibility to humans.

Given a 48 kHz sampling rate, the duration of a particular signal will be approximately 5 milliseconds. The 343 meters per second propagation speed of the signal is the known speed of sound in air at 20 degrees Celsius. Temperature and humidity fluctuations in retail environments result in variations in measurements. These are typically negligible. However, in one embodiment, the system provides temperature and humidity measurement devices networked with the GCP's to optimize geo-location precision.

There are several possible methods discussed and tested for measuring distances. The first is the Time of Arrival (TOA) approach. With TOA, the mobile electronic device is synchronized to the GCP grid infrastructure, e.g., by use of Wi-FI alert or other radio frequency, pulse per second. In this embodiment, the mobile electronic device's (local) clock does not need to be changed, however, an offset to the GCP grid's system (global) clock is estimated.

Signal sequences are recorded by the mobile electronic device at a given update rate, according to the rate of signal emission in the GCPs, and transmitted to the GCPs over Wi-Fi, or other wireless network.

A matched filter outputs sample positions within the recording, where the similarity to the respective source signal is the highest. This can be done sequentially for all source signals in the system.

One way to do that is to cross correlate the recorded sequence against the reverse of each source signal. Assuming a direct line of sight, the first peak detected in each of the resulting correlation signals yields the time span in samples between signal emission on the corresponding GCPs and its arrival time at the mobile electronic device.

A common time adjustment is added to this time span, according to the synchronization offset. Dividing this number of samples by the sampling rate gives us the transit time in seconds. Multiplying this time by the propagation speed (speed of sound at a given temperature and humidity) gives us the desired distances from GCPs in the vicinity of the mobile electronic device. As the GCPs' absolute positions are each fixed and known the GCP's respective distances to a mobile electronic device is computed using a range based positioning method, e.g., a least-squares-approach, so position can be fixed in three dimensions.

Precision of the presented ultrasound ranging approach is influenced by the achieved synchronization accuracy and other variable latencies during the processing. Theoretical precision (lower bound) is the inverse of the sampling rate, multiplied by the propagation speed. E.g., at a 48 kHz sampling rate, the spatial resolution of measured distances would be ($1/48000$) seconds*343 meters per second, which is approximately 7 millimeters. Redundancy in measurements to different emitters can improve positioning accuracy. Accordingly, the theoretical accuracy at a 48 kHz sampling rate is 0.7 cm. The theoretical accuracy at a 96 kHz sampling rate is 0.35 cm.

Grid Description

In a structure such as a store there is typically floor and a ceiling. In one embodiment the set of GCPs 12-26 are coplanar, being located at a same height with respect to the floor. The set of GCP's resides on a common plane, above customers. It can be appreciated that co-planar positioning of GCP's is not required by the positioning algorithm, it can operate at variable beacon locations.

Each GCP has a speaker and necessary circuitry to play back sounds. The speaker should be optimized for 18-24 kHz range. Future embodiments could operate at frequencies above 24 kHz, e.g., up to 30 kHz.

Each GCP also has an RF transmitter that continuously transmits an ID which is unique for each GCP. These IDs are compatible with Bluetooth/Wi-Fi IDs that are normally transmitted by access points to advertise their availability. The RF transmitters are not necessarily access points and are not necessarily able to respond to connection attempts.

In the case of Wi-Fi, the ID will be in the form of a GCP frame. GCP frames are normally used to advertise the presence of an available access point and are normally received without establishing a connection. A GCP frame carries a SSID (Service Set Identifier) and RSSID among other things. SSID identifies a network, whereas RSSID is equivalent to access point's MAC address. This allows all GCPs to potentially broadcast the same SSID, allowing the whole grid to appear as one single network to a user if he searches for an access point. This will prevent cluttering of Wi-Fi AP lists. At the same time RSSID allows us to identify the unique device from which the signal originated.

In some implementations RF transmitters are replaced with functional Wi-Fi Access Points. These can be used to deliver context-sensitive information to the user's mobile electronic device. The fact that all GCPs in the network have the same SSID also facilitates Wi-Fi roaming.

Figure 4:
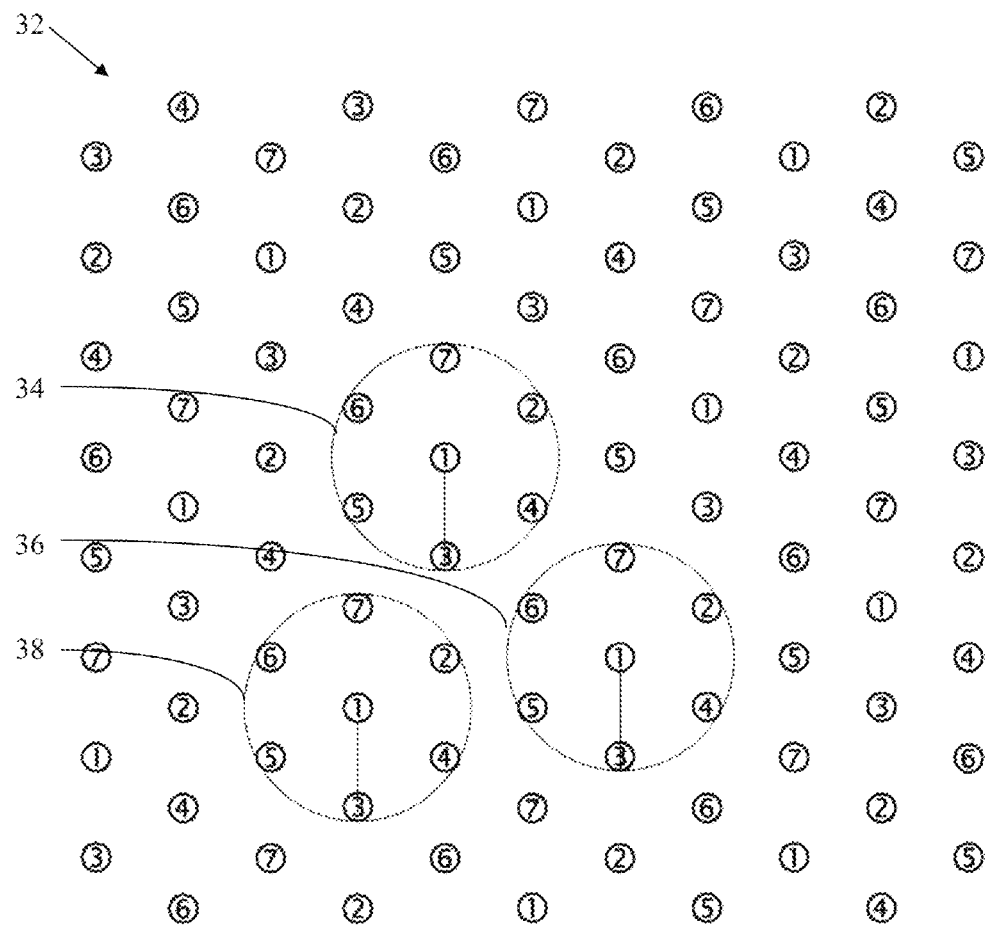
FIG. 4 is a grid of constellations in accordance with the present invention.

FIG. 4 shows an array 32 of co-planar GCP locations represented by encircled integers. In this embodiment, each GCP produces a signal having one of seven frequencies. The GCP signals are ultrasonic and produced simultaneously from each GCP.

The frequency of each GCP is expressed by the integer 1-7 and the GCPS having the frequency expressed by the integer one are shown encircled by circles 34, 36 and 38 demonstrating a constellation of GCP's.

The constellations 34-38 are regions where each of the seven frequencies are present. While the constellations 24-38 are arbitrarily selected having the integer one at the center, it can be appreciated that constellations can be defined having any integer at the center, and still be surrounded by GCP's broadcasting the seven frequencies.

The seven frequencies are assigned in such a way that they form a particular geometric pattern that repeats itself throughout the covered area. Each of the seven GCPs in the constellation produces one of the seven frequency signals. Each frequency signal appears only once in each constellation and the same order in which they are arranged is preserved throughout the grid.

For a 10 Hz update rate, the signal is repeated with 100 millisecond intervals. In this particular embodiment, there are seven different source (positioning) signals. Each GCP is assigned one of the seven signals. The GCP will always transmit only the signal it was assigned.

In an alternate embodiment, the present invention includes multiple frequency signals emitted by each single GCP. In yet another embodiment, the present invention can include more or less signal frequencies. For example, nine frequencies can be used.

The arrangement of constellations can vary, however the concept of using constellations enables the grid to be propagated in a repeatable way to fit any size or shape space, whether indoors or outdoors. When the pattern (grid) encounters an obstacle such as a wall, constellations at the edge can be trimmed to better accommodate the shape of the covered area.

In one embodiment, GCPs having a common frequency share a shortest common distance forming a triangle. GCPs that share the same frequency form a larger triangular grid. One property of this pattern is that if the minimum distance between any two GCP beacons is equal to n, the minimum distance between two beacons that share the same frequency will always be equal to the square root of 7 times n, or approximately 2.65n. So, for example if the minimum distance between GCPs is 6 meters, GCPs that share the same frequency will be at least 15.9 meters apart. This embodiment utilizes the triangular grid, which typically requires a minimum of 7 frequencies, which is more efficient than a similarly sized rectilinear grid, which typically requires 9 frequencies. Accordingly the triangular grid is preferred.

Because of how every constellation is surrounded by 6 constellations that are identical to it, it can be imagined the constellation wraps in on itself in every direction. Traveling across the pattern in some direction, at some point there will be an exit of one constellation and an entry of neighboring constellation.

Positioning Procedure: Ultrasound Trilateration

All GCPs produce their corresponding ultrasound signals simultaneously at a particular rate several times a second. Each emission is accompanied by an RF notification (signal). When a mobile electronic device receives the notification, it immediately starts to record sound using its inbuilt microphone. The recording is stopped after a particular delay (equivalent to cut-off distance).

The delay should be smaller than the time it takes for sound to travel from a GCP to a mobile electronic device that is located exactly between that GCP and an adjacent GCP with the same frequency. Theoretically if the mobile electronic device and the GCPs were on the same plane, this distance would be equal to half the minimum distance between two GCPs of the same type. However in practice GCPs will be located on a different plane than mobile electronic devices, so this distance can be a little longer.

One property of the circle described above is that objects on one plane that appear to be inside the circle will be within the cut-off distance from an object on another plane located at the centre of the circle. It therefore can be observed that there can be at most seven GCPs within the cut-off distance, each with a unique frequency.

The time the ultrasound signal was sent (thanks to the RF signal which reaches the mobile electronic device instantaneously) and the time it was received it is possible to calculate the distance the signal traveled using the speed of sound.

Since the sources of all detected signals fit in one constellation, each signal can be assigned to a specific GCP in the constellation thanks to the fact that there is only one fixed source of a particular frequency in the constellation. The relative position of each GCP is fixed and known.

It is therefore possible to calculate the precise position of the mobile electronic device in relation to the constellation. To position a mobile electronic device in 3D only three distances are necessary (two potential positions will be produced, only one being on the positioning plane), so with minimum four known distances there is enough room for error correction.

In some implementations RF signal is not used to mark the time ultrasound signals are sent. In this case mobile electronic device's position can be found using Time Difference of Arrival (TDoA) rather than Time of Arrival (ToA). This requires at least 4 GCPs to trilaterate a mobile electronic device in three dimensions, an extra GCP being necessary to compensate for the lack of information about the time the signals were sent. Since a minimum of 4 GCPs are always present within the cut-off radius this approach is also viable.

One of the potential positions is the correct position of the mobile electronic device and it is cm accurate.

The correct position is at least square root of 7 times n away from another potential position, where is the minimal distance between any two GCPs. So if for example GCPs had 6 meter spacing, the correct position will be at least 15.9 meters away from the closest alternative.

When combined, these two facts mean that if we had a very rough estimate of where the mobile electronic device is in the grid, we could use it to pick the correct position from the list of potential positions. Given 6 meter distance between GCPs, even if the estimate has 6-7 meter error, it would still be possible to correctly pick the position, because the estimate would still be closer to the correct position than any alternative position. The error in ultrasound positioning estimation is not a factor as ultrasound positioning is centimeter-accurate.

If the positioning has been running continuously this estimate can be obtained from the previous positioning fix. If positioning fixes are done once a second, it is unlikely that the user has moved more than 1 meter since the last fix, which is a lot less than our 7 meter error margin.

It is important to note that unlike traditional dead reckoning, this approach is not subjected to error accumulation over time. This is because the mobile electronic device's previous position is not used directly in calculating the new position. Instead it is only used to pick the correct position from a list of potential positions, one of which is correct and very accurate. It is then discarded, so error doesn't get accumulated. Also the only way it can introduce error is if the wrong entry is picked from the list of potential positions. This is unlikely due to the high error margin and can easily be avoided by closely monitoring how the mobile electronic device's position changes with each positioning fix. As a result the mobile electronic device can be tracked indefinitely with no accuracy degradation provided that tracking is not interrupted.

There are a number of situations in which the previous mobile electronic device's position is not available:
The service has just been activated by the user.
The service has been paused and resumed.
The user has just entered the covered area.
There was a software error.
GCPs had to be deactivated and restarted.

In these cases an alternative method must be used to get a rough estimate of the mobile electronic device's position in the grid. Note that this must be done only once, the next positioning fix will be able to use the last result as such an estimate and the service may continue to function as described above.

There are many different methods that can position a mobile electronic device indoors with accuracy below 7 meters. The method that we propose to use is described in the next section.

Wi-Fi Coarse Positioning

Once the list of potential positions has been generated the following steps can be done to pick the correct entry. For each point in the list of potential positions the system generates a list of 5 closest GCPs and puts their RF IDs in a "modeled top5" list starting with the closest GCP. As a result each of the points is assigned its own top5 list with IDs that are most likely to be detected at that spot.

The mobile electronic device uses its Wi-Fi hardware to scan for available access points (inquiry scan) and makes a list of IDs it has discovered.

The number of detected IDs will depend on transmitter strength and can be adjusted. Realistically IDs are unlikely to appear in exactly this order due to various hardware and technology limitations. Some IDs may fail to be detected.

Note that this step can be done simultaneously with the ultrasound positioning phase. This way the entire positioning fix can take less time. Also if Wi-Fi hardware is not used for other purposes such as content delivery, it can be quickly activated, used to do this one scan and immediately deactivated so as to conserve power.

Once steps 1 and 2 are done all that is left to determine mobile electronic device's true position is to compare all modeled top5 lists (from step 1) with the observed top5 list (from step 2) and find the one that converges the most. Since modeled top5 lists for spots that are far away from mobile electronic device's true location will have no common IDs with the observed top5 list we will have a look only at adjacent spots.

GCP Methods

Figure 6:
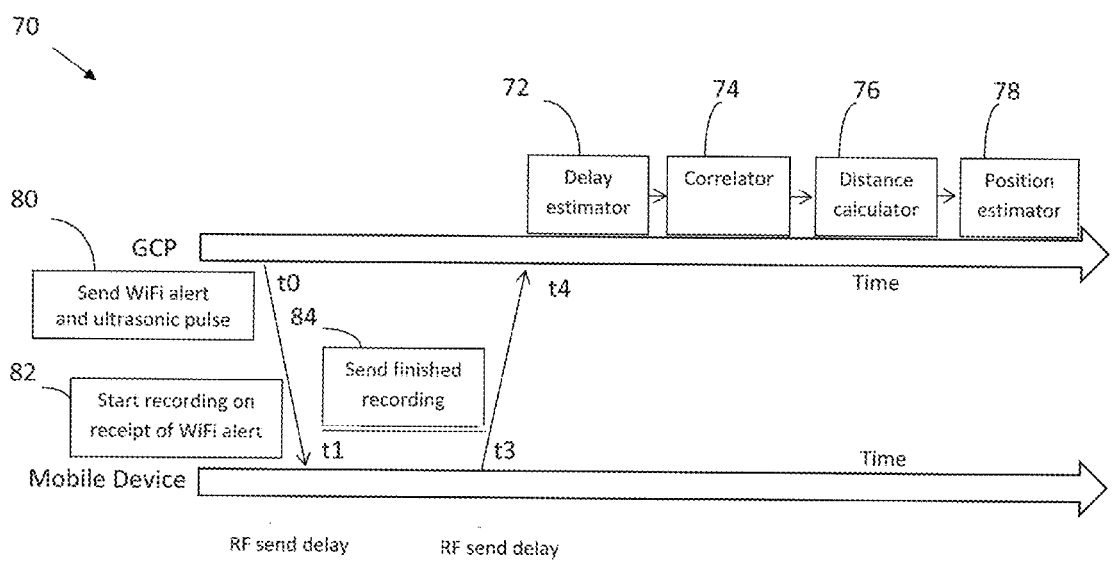
FIG. 6 is a flow diagram of the system function.

FIG. 6 his a method of operating the GCP generally designated by the referenced 70. The method 70 includes the step 80 of the GCP sending a WiFi alert (RF sync pulse including local timestamp t0) and then immediately sending an ultrasonic signal pulse of a pre-determined frequency. The ultrasonic signal pulse from the GCP, along with ultrasonic signal pulses of different frequencies from other GCP's are received by the mobile electronic device. The mobile electronic device saves received timestamp of arriving sync pulse, and local timestamp t1, and starts recording ambient sound for a predetermined period of time, for example 20 ms.

When the mobile electronic device finishes recording the ambient sound the step 84 sends to finish recording. Preferably the mobile electronic device immediately sends the recording to GCP at local timestamp t3. The GCP receives the recording at local timestamp t4, and starts processing to calculate distance.

The step 72 employs a delay estimator to enable the GCP to estimate delay according to the following: With respect to GCP time, t4 would equal t0+(t1−t0)+(recording duration)+(t4−t3). The differences (t1−t0), and (t4−t3) are the pulse send delay, and assumed equal (symmetric transmission delay). This delay needs to be estimated, it is assumed to be stable over the full operation time.

$$t4=t0+2*(\text{RF send delay})+(\text{recording duration}).$$

$$\text{RF send delay}=(t4-t0+(\text{recording duration}))/2.$$

Since t4 and t0 are local GCP, and recording duration is known to the GCP, this pulse send delay can be solved.

The step 74 employees correlator to enable the GCP to correlate the received recording against all positioning signals. Optionally: Square results of cross correlation and build envelope function. For each positioning signal, count samples to first correlation peak.

The step 76 employees a distance calculator to enable the GCP to compensate for pulse send delay, i.e., by subtracting from the number of pulse samples to first cross correlation peak. The GCP divides by the sampling rate, then multiplies by the speed of sound to get to distances in meter.

The step 78 employees a position to enable the CPG to estimate position of the mobile electronic device by solving for the mobile device's position, given the known GCP positions, and the respective distances, e.g., by trilateration.

This detailed description is provided by way of example only, many variations of the invention are encompassed by the inventors. For example, the present invention can be used for inventory management in a warehouse, or tracking of electronic devices or manufacturing components in a factory. Portable electronic devices can be fashioned to perform only the functions required herein and can be attached to manufacturing components or containers for tracking purposes. Accordingly, the scope of the invention is defined by the appended claims.

We claim:

1. A system for indoor location identification, in three dimensions (3D), comprising:
   a retail store having a ceiling;
   a plurality of networked geo-context panels mounted on the ceiling;
   each geo-context panel having a network communication device and an ultrasound transmitter capable of broadcasting ultrasonic pulses having a duration of less than 100 ins,
   a portable electronic device in the retail store for receiving and recording ultrasonic pulses to make a recording, and for communicating the recording to at least one of said plurality of geo-context panels to enable the at least one said geo-context panel to determine a precise location in 3D of the electronic device, wherein at least some of the geo-context panels form a constellation, and each of the geo-context panels in the constellation transmit ultrasonic pulses of a different frequency.

2. The system as set forth in claim 1 further comprising: a means for coarse localization in communication with at least one of said geo context panels to determine a general location of the portable electronic device, the geo-context panels utilize the general location to enable rapid determination of the precise location.

3. The system as set forth in claim 1, wherein the geo-context panels transmit ultrasonic pulses of a different frequency simultaneously.

4. The system as set forth in claim 3, wherein the ultrasonic pulses have a duration of less than 100 ins.

5. The system as set forth in claim 4, wherein the ultrasonic pulses have a duration of less than 20 ins.

6. The system as set forth in claim 5, wherein the ultrasonic pulses have a duration of less than 5 ins.

7. The system as set forth in claim 1, wherein the constellation generates at least seven different frequency ultrasonic pulses.

8. The system as set forth in claim 1, wherein the portable electronic device includes a network communication device that communicates the recording to at least one of said geo-context panels.

9. The system as set forth in claim 8, wherein the recording is communicated within 100 ins from the time the recording is made.

10. The system as set forth in claim 1, wherein the geo-context panels communicate product information to the portable electronic device.

11. The system as set forth in claim 1, wherein the geo-context panels communicate product information to the portable electronic device, and the product information relates to products proximal to the portable electronic device.

12. The system as set forth in claim 1, wherein the geo-context panels communicate product information to the portable electronic device, and the product information relates to non-inventoried products of interest.

13. The system as set forth in claim 1, wherein the geo-context panels communicate discount coupons to the portable electronic device, and the discount coupons related to the products of interest are proximal to the portable electronic device.

14. The system as set forth in claim 1, wherein said geo-context panels use trilateration to determine the location of the portable electronic device.

15. A system for indoor location identification in three dimensions (3D), comprising:
  a retail store having a floor;
  a plurality of co-planar geo-context panels mounted above the floor;
  each panel including a wireless network access point and an ultrasound transmitter capable of communicating ultrasonic pulses in at least seven frequencies, to enable trilaterated identification of a location in 3D of the electronic device to within a three centimeter accuracy and wherein at least some of the geo-context panels form a constellation, and each of the geo-context panels in the constellation transmit ultrasonic pulses of a different frequency.

16. The system as set forth in claim 15, wherein the geo-context panels use the location of the electronic device to communicates data relating to a product of interest, where the product of interest is within a predetermined distance from the electronic device.

17. The system as set forth in claim 16, wherein the geo-context panels use the location of the electronic device to communicates offers to sell items relating to the product of Interest.

18. A geo-context system, comprising:
  a structure having a floor;
  at least seven geo-context panels mounted above the floor in a co-planar arrangement for simultaneously broadcasting ultrasonic pulses, each said geo-context panels being capable of broadcasting an ultrasonic pulse having an ultrasonic frequency capable of being recorded by a portable electronic device using a sampling rate of at least 44 kHz;
  the geo-context panels being enabled to communicate with at least one portable electronic device in communication with at least one of said geo-context panels and having a microphone for recording ultrasonic pulses at sampling rate of at least 44 kHz and for storing the recording;
  the geo-context panels being enabled to receive recordings of the ultrasonic pulses to enable trilaterated identification of a location of the electronic device;
  wherein at least some of the geo-context panels form a constellation, and each of the geo-context panels in the constellation transmit ultrasonic pulses of a different frequency.

19. The system as set forth in claim 8, wherein the sampling rate is at least 96 kHz.

* * * * *